US011614203B2

(12) United States Patent
Mori

(10) Patent No.: US 11,614,203 B2
(45) Date of Patent: Mar. 28, 2023

(54) HYDROGEN FILLING SYSTEM

(71) Applicant: TOYOTA JIDOSHA KABUSHIKI KAISHA, Toyota (JP)

(72) Inventor: Daigoro Mori, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/457,391

(22) Filed: Dec. 2, 2021

(65) Prior Publication Data

US 2022/0221109 A1  Jul. 14, 2022

(30) Foreign Application Priority Data

Jan. 8, 2021  (JP) .............................. JP2021-002241

(51) Int. Cl.
 *F17C 5/00* (2006.01)
(52) U.S. Cl.
 CPC ........ *F17C 5/007* (2013.01); *F17C 2221/012* (2013.01); *F17C 2250/043* (2013.01); *F17C 2250/0439* (2013.01); *F17C 2270/0139* (2013.01); *F17C 2270/0184* (2013.01)
(58) Field of Classification Search
 CPC ................ F17C 5/007; F17C 2221/012; F17C 2250/043; F17C 2250/0439; F17C 2270/0139; F17C 2270/0184; F17C 2250/0434; F17C 2250/0417
 USPC .......................................................... 141/95
 See application file for complete search history.

(56) References Cited

U.S. PATENT DOCUMENTS

| 5,628,349 | A | * | 5/1997 | Diggins | .................... | F17C 5/06 |
| | | | | | | 141/3 |
| 8,783,303 | B2 | * | 7/2014 | Harty | .................... | F17C 13/025 |
| | | | | | | 141/2 |
| 9,863,583 | B2 | * | 1/2018 | Youlio | .................... | F17C 13/04 |
| 2003/0150510 | A1 | * | 8/2003 | Cohen | ....................... | F17C 5/06 |
| | | | | | | 141/98 |

(Continued)

FOREIGN PATENT DOCUMENTS

JP  2010286015 A  12/2010

OTHER PUBLICATIONS

SAE J2601, Fueling Protocols for Light Duty Gaseous Hydrogen Surface Vehicles https://www.sae.org/standards/content/j2601_201407/.

*Primary Examiner* — Timothy P. Kelly
*Assistant Examiner* — Stephanie A Shrieves
(74) *Attorney, Agent, or Firm* — Hunton Andrews Kurth LLP

(57) ABSTRACT

A hydrogen filling system includes a first tank and a second tank that are configured to be filled with hydrogen and communicate with each other, a first hydrogen feeder and a second hydrogen feeder configured to feed hydrogen to the first tank and the second tank, and a controller configured to control the first hydrogen feeder and the second hydrogen feeder. The controller estimates a hydrogen fill factor of the first tank and the second tank, based on a first internal temperature of the first tank and a second internal temperature of the second tank, and a first pressure of hydrogen gas fed from the first hydrogen feeder and a second pressure of hydrogen gas fed from the second hydrogen feeder. The controller is configured to stop the first hydrogen feeder and the second hydrogen feeder when the hydrogen fill factor reaches a predetermined threshold fill factor.

4 Claims, 2 Drawing Sheets

(56) References Cited

U.S. PATENT DOCUMENTS

| | | | |
|---|---|---|---|
| 2007/0186982 A1* | 8/2007 | Cohen | F17C 13/025 |
| | | | 137/487.5 |
| 2010/0307636 A1 | 12/2010 | Uemura | |
| 2012/0205003 A1* | 8/2012 | Okawachi, I | F17C 5/00 |
| | | | 141/95 |
| 2012/0216910 A1* | 8/2012 | Inagi | F17C 5/06 |
| | | | 141/94 |
| 2017/0059089 A1* | 3/2017 | Uchida | F17C 13/02 |
| 2017/0074707 A1* | 3/2017 | Mathison | G01F 22/02 |
| 2021/0388947 A1* | 12/2021 | Yoshida | F17C 5/06 |

* cited by examiner

HYDROGEN FILLING SYSTEM

CROSS-REFERENCE TO RELATED APPLICATION

This application claims priority to Japanese Patent Application No. 2021-002241 filed on Jan. 8, 2021, incorporated herein by reference in its entirety.

BACKGROUND

1. Technical Field

The technology disclosed in the present specification relates to a hydrogen filling system.

2. Description of Related Art

Japanese Unexamined Patent Application Publication No. 2010-286015 (JP 2010-286015 A) discloses an example of a hydrogen filling system. A hydrogen tank is installed in a fuel cell vehicle. Hydrogen is fed from a hydrogen feeder to the hydrogen tank. The amount of hydrogen in the hydrogen tank (hydrogen fill factor) is estimated from the temperature and pressure in the hydrogen tank. In the following, the hydrogen tank will be referred to simply as "tank" for the sake of simplification of description.

SUMMARY

Filling a plurality of tanks connected to each other with hydrogen increases filling time. The filling time can be shortened by connecting a plurality of hydrogen feeders to the tanks at the same time to feed hydrogen. As described above, the hydrogen fill factor is found from the internal temperature and internal pressure of the tank. However, when hydrogen is fed from the hydrogen feeders to a tank having a large total capacity, the pressure in the tank varies locally, making it difficult to accurately find the hydrogen fill factor, leading to difficulty in filling with hydrogen to an appropriate hydrogen fill factor. The present specification provides a technology that enables filling a tank with hydrogen to an appropriate hydrogen fill factor, in a hydrogen filling system in which hydrogen is fed from a plurality of hydrogen feeders to a tank at the same time.

One aspect of the present disclosure provides a hydrogen filling system. The hydrogen filling system includes a first tank and a second tank that are configured to be filled with hydrogen and communicate with each other, a first hydrogen feeder and a second hydrogen feeder configured to feed hydrogen to the first tank and the second tank, and a controller configured to control the first hydrogen feeder and the second hydrogen feeder. The controller estimates a hydrogen fill factor of the first tank and the second tank, based on an internal temperature of the first tank (first internal temperature) and an internal temperature of the second tank (second internal temperature), and a pressure of hydrogen fed from the first hydrogen feeder (first pressure) and a pressure of hydrogen fed from the second hydrogen feeder (second pressure). The controller is configured to stop the first hydrogen feeder and the second hydrogen feeder when the hydrogen fill factor reaches a predetermined threshold fill factor. The technology disclosed in the present specification can appropriately find the hydrogen fill factor using the first internal temperature, the second internal temperature, the first pressure, and the second pressure. Accordingly, the hydrogen tanks can be filled with hydrogen to an appropriate hydrogen fill factor.

An example of a hydrogen filling process executed by the controller is as follows. The controller may calculate a first hydrogen fill factor that is the total hydrogen fill factor of the first tank and the second tank based on the first pressure and the first internal temperature. The controller may calculate a second hydrogen fill factor that is the total hydrogen fill factor of the first tank and the second tank based on the second pressure and the second internal temperature. The controller may stop the first hydrogen feeder and the second hydrogen feeder when a higher fill factor of the first hydrogen fill factor and the second hydrogen fill factor reaches the threshold fill factor. The controller calculates two hydrogen fill factors, and controls the first and the second hydrogen feeders based on the higher hydrogen fill factor. Thus, the tanks are prevented from being overfilled with hydrogen.

Note that the hydrogen fill factor obtained from the temperature and the pressure is not dependent on the capacity of the tank, and the first tank and the second tank are connected. Accordingly, the phrase "hydrogen fill factors of the first tank and the second tank" may be reworded as "hydrogen fill factor of the first tank" or "hydrogen fill factor of the second tank".

It is desirable that the first and the second tanks and the first and the second hydrogen feeders have the following relation. A length of a hydrogen feed channel from the first hydrogen feeder to the first tank may be shorter than a length of a hydrogen feed channel from the first hydrogen feeder to the second tank, and a length of the hydrogen feed channel from the second hydrogen feeder to the second tank may be shorter than a length of the hydrogen feed channel from the second hydrogen feeder to the first tank. When such a relation is established, the first tank is primarily fed with hydrogen from the first hydrogen feeder, and the second tank is primarily fed with hydrogen from the second hydrogen feeder.

The hydrogen fill factors of the first tank and the second tank that are connected should originally be the same, but there is flow channel resistance between the first tank and the second tank, and there are cases in which the hydrogen fill factor of the first tank and the hydrogen fill factor of the second tank are different. When the above relation holds, the first temperature and the first pressure can appropriately represent the hydrogen fill factor in the first tank, and the second temperature and the second pressure can appropriately represent the hydrogen fill factor in the second tank. This enables the hydrogen fill factor of the first tank and the second tank to be appropriately expressed. Overfilling can be prevented by controlling the first and the second hydrogen feeders according to the larger value of the hydrogen fill factors.

The controller may calculate the hydrogen fill factor based on an average value of the first internal temperature and the second internal temperature, and a higher pressure of the first pressure and the second pressure. An average hydrogen fill factor can be obtained even though there may be variance in temperatures within the hydrogen tanks.

The first tank may be configured of a plurality of sub-tanks, and the first internal temperature may be the highest temperature of internal temperatures of the sub-tanks. Similarly, the second tank may be configured of a plurality of sub-tanks, and the second internal temperature may be the highest temperature of the internal temperatures of the sub-tanks. Thus, the sub-tanks can be filled with hydrogen more safely. Note that the term "sub-tank" is an expression for distinguishing from the above "first tank" and "second tank" for the sake of convenience, and does not limit the capacity or performance thereof.

Another aspect of the present disclosure provides a hydrogen filling system. The hydrogen filling system includes a tank configured to be filled with hydrogen, a first hydrogen feeder and a second hydrogen feeder configured to feed hydrogen to the tank, and a controller configured to control the first hydrogen feeder and the second hydrogen feeder. The controller is configured to calculate a first hydrogen fill factor of the tank based on an internal temperature of the tank and a first pressure of hydrogen fed from the first hydrogen feeder, calculate a second hydrogen fill factor of the tank based on the internal temperature and a second pressure of hydrogen fed from the second hydrogen feeder, and stop the first hydrogen feeder and the second hydrogen feeder when a higher fill factor of the first hydrogen fill factor and the second hydrogen fill factor reaches a predetermined threshold fill factor.

Details of the technology disclosed in the present specification and further improvements will be described in the "DETAILED DESCRIPTION OF EMBODIMENTS" below.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
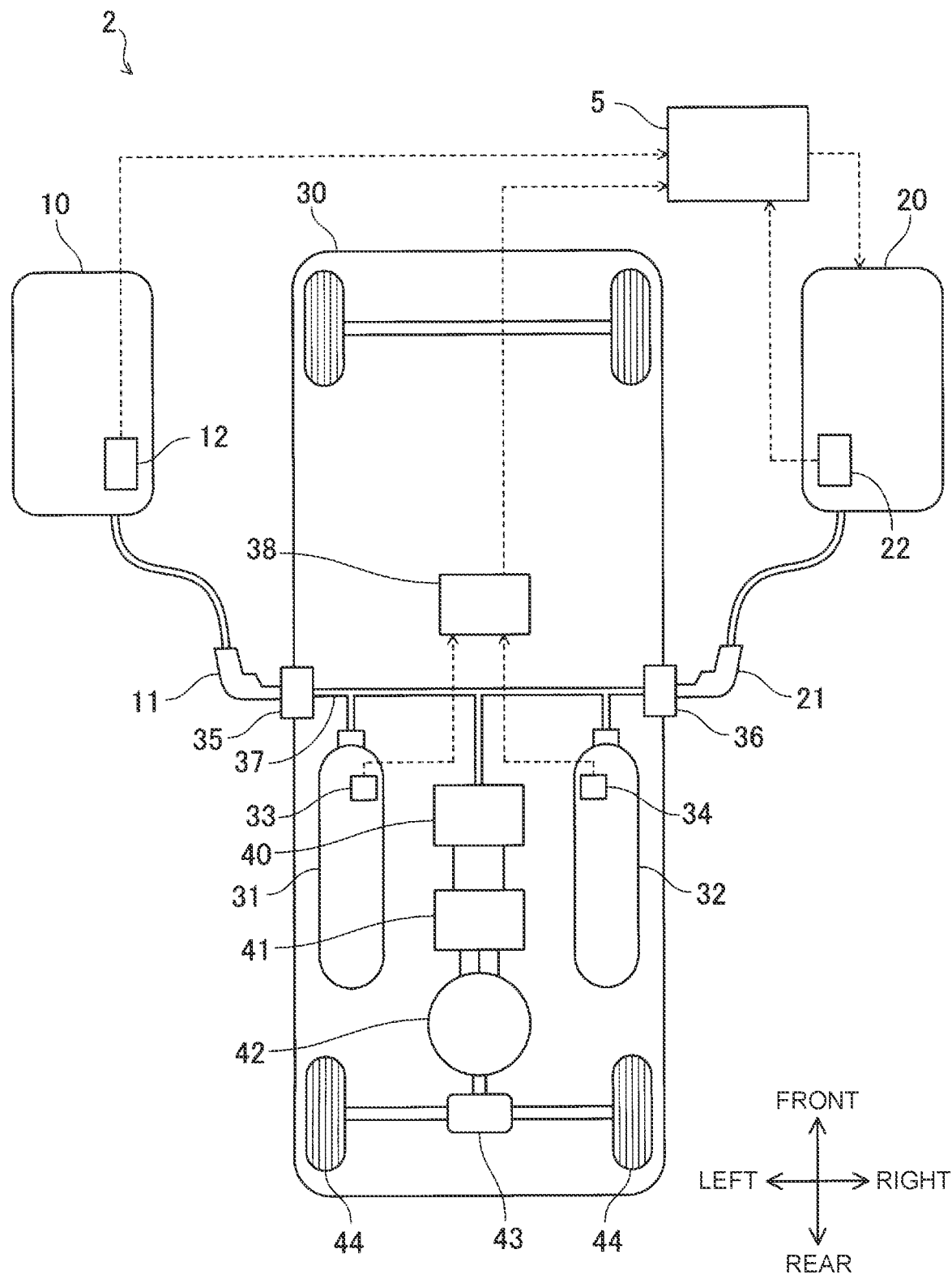
FIG. 1 is a block diagram of a hydrogen filling system according to a first embodiment.

A hydrogen filling system 2 according to a first embodiment will be described with reference to FIG. 1. FIG. 1 is a block diagram of a hydrogen filling system 2 according to the first embodiment. The hydrogen filling system 2 is configured of a first hydrogen feeder 10, a second hydrogen feeder 20, and a fuel cell vehicle 30 that is provided with a first tank 31 and a second tank 32. FIG. 1 is a plan view illustrating a layout of the first hydrogen feeder 10, the second hydrogen feeder 20, and the fuel cell vehicle 30. In FIG. 1, dashed arrow lines represent signal lines.

The fuel cell vehicle 30 is provided with a fuel cell 40, an inverter 41, and a motor 42. The first tank 31 and the second tank 32 that store hydrogen, and the fuel cell 40 are connected by a fuel pipe 37, and hydrogen in the first tank 31 and the second tank 32 is fed to the fuel cell 40 through the fuel pipe 37. The fuel pipe 37 is also connected to a first filling port 35 and a second filling port 36.

Direct current electric power generated by the fuel cell 40 is converted into alternating current electric power by the inverter 41. The alternating current electric power output by the inverter 41 is fed to the traction motor 42. Output torque of the motor 42 is transmitted to rear wheels 44, which are driving wheels, via a differential gear 43.

The first tank 31 is provided with a temperature sensor 33 for measuring the internal temperature (first internal temperature) of the first tank 31, and the second tank 32 is provided with a temperature sensor 34 for measuring the internal temperature of the second tank 32 (second internal temperature). Measurement data of the temperature sensors 33 and 34 is sent to a controller (vehicle controller 38) of the fuel cell vehicle 30.

FIG. 1 shows a state in which the fuel cell vehicle 30 is stopped at a hydrogen station and hydrogen is being fed thereto. The hydrogen station is provided with two hydrogen feeders (first hydrogen feeder 10 and second hydrogen feeder 20). The total tank capacity of the fuel cell vehicle 30 (the total capacity of the first tank 31 and the second tank 32) is large. The fuel cell vehicle 30 is provided with two filling ports 35 and 36 so that hydrogen can be fed from the first hydrogen feeder 10 and the second hydrogen feeder 20 at the same time. The fuel cell vehicle 30 can be fed with hydrogen from the two hydrogen feeders 10 and 20 at the same time, and accordingly the hydrogen filling time for the first tank 31 and the second tank 32 is shortened.

A nozzle (first nozzle 11) of the first hydrogen feeder 10 is connected to the first filling port 35, and a nozzle (second nozzle 21) of the second hydrogen feeder 20 is connected to the second filling port 36. The hydrogen of the first hydrogen feeder 10 is fed to the first tank 31 and the second tank 32 through the first nozzle 11, the first filling port 35, and the fuel pipe 37. The hydrogen of the second hydrogen feeder 20 is fed to the first tank 31 and the second tank 32 through the second nozzle 21, the second filling port 36, and the fuel pipe 37.

The first hydrogen feeder 10 is provided with a pressure sensor 12 for measuring the feeding pressure (first pressure) of hydrogen fed from the first hydrogen feeder 10, and the second hydrogen feeder 20 is provided with a pressure sensor 22 for measuring the feeding pressure (second pressure) of hydrogen fed from the second hydrogen feeder 20. A station controller 5 controls the first hydrogen feeder 10 and the second hydrogen feeder 20. Measurement data of the pressure sensors 12 and 22 is sent to the station controller 5.

While hydrogen is being fed to the first tank 31 and the second tank 32 of the fuel cell vehicle 30, the station controller 5 and the vehicle controller 38 can communicate with each other. When detecting that the first nozzle 11 is connected to the first filling port 35 and the second nozzle 21 is connected to the second filling port 36, the station controller 5 notifies the vehicle controller 38 of the start of feeding hydrogen, and also starts feeding hydrogen from the first hydrogen feeder 10 and the second hydrogen feeder 20.

In general, it is well known that the hydrogen fill factor in a tank is expressed as a function of the internal pressure and the internal temperature of the tank. Note that the hydrogen fill factor means the ratio of the amount of hydrogen currently filled as to the amount of hydrogen when fully filled. The hydrogen fill factor obtained from the internal pressure and the internal temperature of the tank is not dependent on the capacity of the tank. An expression for calculating the hydrogen fill factor from the internal pressure and the internal temperature of the tank is specified in the literature (SAE-J2601, Fueling Protocols for Light Duty Gaseous Hydrogen, https://www.sae.org/standards/content/j2601_201407/).

The fuel cell vehicle 30 is provided with two hydrogen tanks, and is fed with hydrogen through two locations (the first filling port 35 and the second filling port 36). Further, there also is flow channel resistance on the fuel pipe 37 connecting the first tank 31 and the second tank 32. Accordingly, the temperature and the pressure inside the tanks may vary depending on the position inside the tanks. The hydrogen filling system 2 can accurately find the hydrogen fill factor based on the temperature inside the tank at a plurality of positions and the hydrogen pressure at a plurality of positions, and can fill the tank with hydrogen to an appropriate hydrogen fill factor.

The station controller 5 controls the first hydrogen feeder 10 and the second hydrogen feeder 20. The hydrogen feeding process executed by the station controller 5 will be described.

The station controller 5 receives data regarding the first internal temperature and the second internal temperature from the vehicle controller 38. The station controller 5 accurately finds a total hydrogen fill factor of the first tank 31 and the second tank 32 (a hydrogen fill factor as to the total capacity of the capacity of the first tank 31 and the capacity of the second tank 32) based on the first internal temperature, the second internal temperature, the first pressure, and the second pressure.

As illustrated in FIG. 1, the first tank 31 and the first filling port 35 are arranged on the left side of the vehicle, and the first hydrogen feeder 10 is located on the left side of the vehicle. The second tank 32 and the second filling port 36 are arranged on the right side of the vehicle, and the second hydrogen feeder 20 is located on the right side of the vehicle. The first tank 31, the second tank 32, the first filling port 35, and the second filling port 36 are connected by the fuel pipe 37. The hydrogen feed channel from the first hydrogen feeder 10 to the first tank 31 is shorter than the hydrogen feed channel from the first hydrogen feeder 10 to the second tank 32. By shortening the hydrogen feed channel, the pressure loss between the pressure sensor and the tank is reduced, error in the calculated fill factor is reduced, and the fill rate (amount filled per time unit) can be increased as compared to when there is only one feeder. Also, the hydrogen feed channel from the second hydrogen feeder 20 to the second tank 32 is shorter than the hydrogen feed channel from the second hydrogen feeder 20 to the first tank 31. As described above, the first tank 31 and the second tank 32 are connected by the fuel pipe 37 that is slender. Accordingly, the first tank 31 is fed hydrogen primarily from the first hydrogen feeder 10, and the second tank 32 is fed hydrogen primarily from the second hydrogen feeder 20.

From the above relation, the hydrogen feed pressure (first pressure) of the first hydrogen feeder 10 is close to the internal pressure of the first tank 31, and the hydrogen feed pressure (second pressure) of the second hydrogen feeder 20 is close to the internal pressure of the second tank 32. The station controller 5 calculates the first hydrogen fill factor based on the first pressure and the first internal temperature, and calculates the second hydrogen fill factor based on the second pressure and the second internal temperature. The first tank 31 and the second tank 32 are connected by the fuel pipe 37, and accordingly it would be natural to assume that the first hydrogen fill factor and the second hydrogen fill factor would be equal to each other. However, when the internal temperature and the pressure vary locally, there are cases in which the first hydrogen fill factor and the second hydrogen fill factor differ. The station controller 5 stops the first hydrogen feeder 10 and the second hydrogen feeder 20 when the higher hydrogen fill factor of the first hydrogen fill factor and the second hydrogen fill factor reaches a predetermined threshold fill factor. Due to the station controller 5 deciding to stop feeding of hydrogen using the higher hydrogen fill factor of the first hydrogen fill factor and the second hydrogen fill factor, overfilling of the hydrogen tank is avoided, and safety of the first tank 31 and the second tank 32 to which hydrogen is filled is improved. The threshold fill factor is set to, for example, 90%.

Alternatively, the station controller 5 may find the total hydrogen fill factor of the first tank 31 and the second tank 32 based on the average value of the first internal temperature and the second internal temperature and the higher pressure of the first pressure and the second pressure. The station controller 5 stops the first hydrogen feeder 10 and the second hydrogen feeder 20 when the obtained hydrogen fill factor reaches the threshold fill factor. The hydrogen fill factor is found based on the higher pressure of the first pressure and the second pressure, and accordingly overfilling is avoided here as well, and the safety of the first tank 31 and the second tank 32 is improved.

In the hydrogen filling system 2 according to the first embodiment, all of the communicating hydrogen tanks (the first tank 31 and the second tank 32) can be filled with hydrogen to an appropriate hydrogen fill factor.

Second Embodiment

Figure 2:
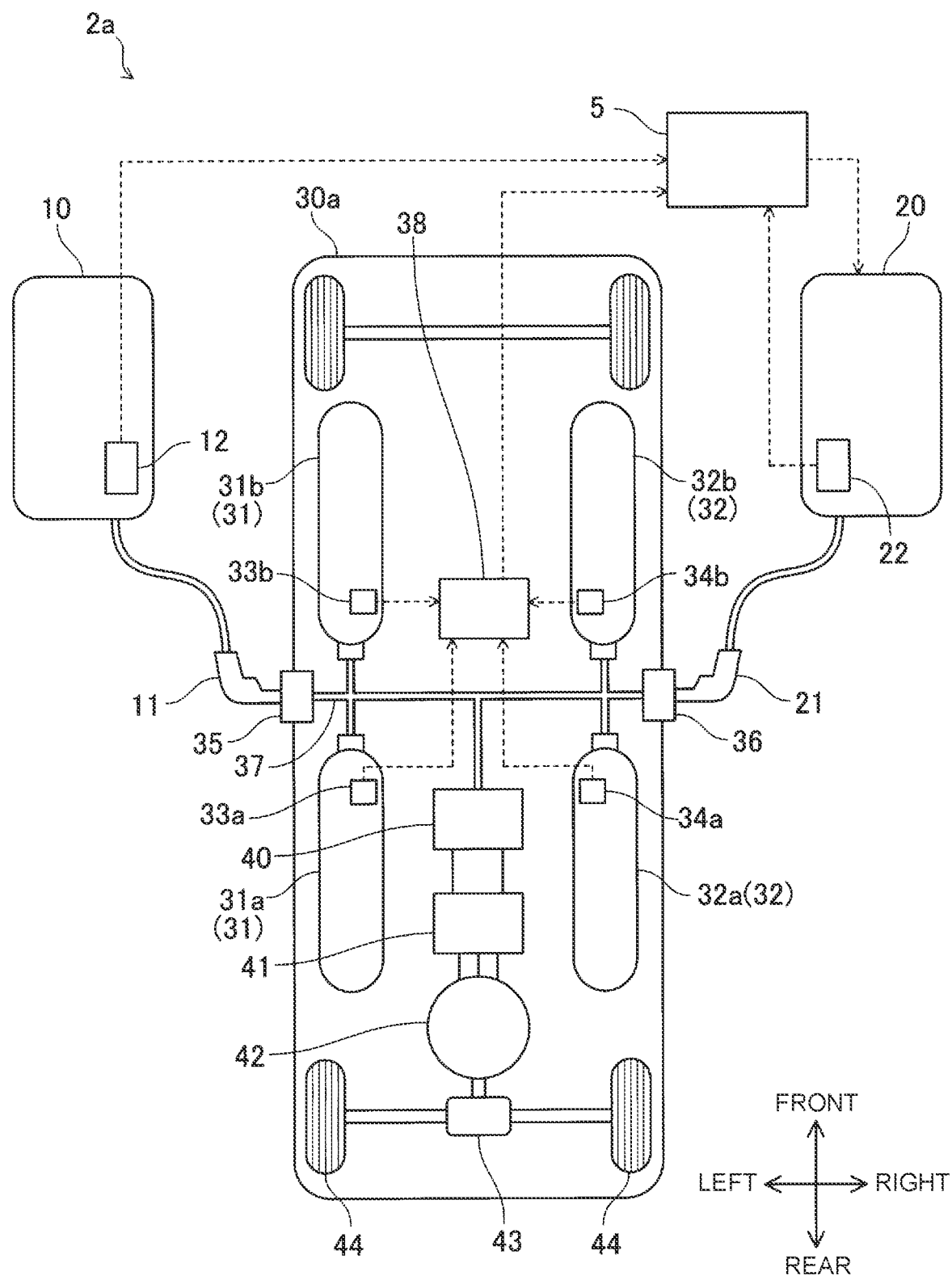
FIG. 2 is a block diagram of a hydrogen filling system according to a second embodiment.

FIG. 2 is a block diagram of a hydrogen filling system 2a according to a second embodiment. The hydrogen filling system 2a is provided with a fuel cell vehicle 30a, the first hydrogen feeder 10, and the second hydrogen feeder 20.

The fuel cell vehicle 30a is provided with four tanks (a No. 1a sub-tank 31a, a No. 1b sub-tank 31b, a No. 2a sub-tank 32a, and a No. 2b sub-tank 32b). The four sub-tanks 31a, 31b, 32a, and 32b are connected by the fuel pipe 37. The No. 1a sub-tank 31a and the No. 1b sub-tank 31b are closer to the first filling port 35 than the No. 2a sub-tank 32a and the No. 2b sub-tank 32b are, and the No. 2a sub-tank 32a and the No. 2b sub-tank 32b are closer to the second filling port 36 than the No. 1a sub-tank 31a and the No. 1b sub-tank 31b are. Note that the term "sub-tank" is an expression for distinguishing from the above-described "first tank 31" and "second tank 32" for the sake of convenience, and does not limit the capacity or performance thereof.

The first hydrogen feeder 10 is connected to the first filling port 35, and the second hydrogen feeder 20 is connected to the second filling port 36. The length of a hydrogen feed channel from the first hydrogen feeder 10 to the No. 1a sub-tank 31a and the No. 1b sub-tank 31b is shorter than a hydrogen feed channel from the first hydrogen feeder 10 to the No. 2a sub-tank 32a and the No. 2b sub-tank 32b. The length of a hydrogen feed channel from the second hydrogen feeder 20 to the No. 2a sub-tank 32a and the No. 2b sub-tank 32b is shorter than the hydrogen feed channel from the second hydrogen feeder 20 to the No. 1a sub-tank 31a and the No. 1b sub-tank 31b. Accordingly, the No. 1a sub-tank 31a and the No. 1b sub-tank 310b are primarily fed hydrogen from the first hydrogen feeder 10, and the No. 2a sub-tank 32a and the No. 2b sub-tank 32b are primarily fed hydrogen from the second hydrogen feeder 20.

The No. 1a sub-tank 31a and the No. 1b sub-tank 31b are grouped as the first tank 31, and the No. 2a sub-tank 32a and the No. 2b sub-tank 32b are grouped as the second tank 32. In other words, the No. 1a sub-tank 31a and the No. 1b sub-tank 31b can be treated as one first tank 31, and the No. 2a sub-tank 32a and the No. 2b sub-tank 32b can be treated as one second tank 32.

The No. 1a sub-tank 31a is provided with a temperature sensor 33a for measuring the internal temperature thereof, and the No. 1b sub-tank 31b is provided with a temperature sensor 33b for measuring the internal temperature thereof. The No. 2a sub-tank 32a is provided with a temperature sensor 34a for measuring the internal temperature thereof, and the No. 2b sub-tank 32b is provided with a temperature sensor 34b for measuring the internal temperature thereof.

Measurement data of the temperature sensors 33a, 33b, 34a, and 34b is sent to the station controller 5 via the vehicle controller 38. The station controller 5 calculates a first hydrogen fill factor based on the higher internal temperature of the internal temperatures of the No. 1a sub-tank 31a and the No. 1b sub-tank 31b grouped as the first tank 31, and the first pressure (hydrogen feed pressure of the first hydrogen feeder 10). The station controller 5 calculates a second hydrogen fill factor based on the higher internal temperature of the internal temperatures of the No. 2a sub-tank 32a and the No. 2b sub-tank 32b grouped as the second tank 32, and the second pressure (hydrogen feed pressure of the second hydrogen feeder 20). The station controller 5 stops the first hydrogen feeder 10 and the second hydrogen feeder 20 when the higher hydrogen fill factor of the first hydrogen fill factor and the second hydrogen fill factor reaches a threshold fill factor. The hydrogen filling system 2a according to the second embodiment can also fill all the communicating tanks 31a, 31b, 32a, and 32b with hydrogen to an appropriate hydrogen fill factor.

Alternatively, the station controller 5 may obtain the hydrogen fill factor using an average value of the measured values of all the temperature sensors and the higher pressure of the first pressure and the second pressure.

Modification

The hydrogen filling systems 2 and 2a are provided with a plurality of tanks. Even when filling one large tank with hydrogen, the filling time can be shortened by filling hydrogen using a plurality of hydrogen feeders at the same time. Even when using one large tank, there are cases in which the pressure and temperature differ depending on the location.

A hydrogen filling system according to a modification is provided with a tank that can be filled with hydrogen, a first hydrogen feeder and a second hydrogen feeder that feed hydrogen to the tank, and a controller that controls a first hydrogen feeder and a second hydrogen feeder. The controller calculates a first hydrogen fill factor of the tank based on the internal temperature of the tank and the first pressure of hydrogen fed from the first hydrogen feeder. The controller also calculates a second hydrogen fill factor of the tank based on the internal temperature of the tank and the second pressure of hydrogen fed from the second hydrogen feeder. The controller stops the first hydrogen feeder and the second hydrogen feeder when the higher fill factor of the first hydrogen fill factor and the second hydrogen fill factor reaches a predetermined threshold fill factor. A large tank can be filled with hydrogen to an appropriate hydrogen fill factor by such a hydrogen filling system as well.

Points to be noted regarding the hydrogen filling systems described in the embodiments and the modification will be described. The hydrogen filling system according to the embodiments uses the pressure of hydrogen fed by the hydrogen feeder (hydrogen feeding pressure) as an approximation value of the internal pressure of the tanks. In the hydrogen filling system according to the embodiments, when two hydrogen feeders are used at the same time, the hydrogen fill factor of the tanks can be appropriately found using the hydrogen feed pressure of each hydrogen feeder.

The technology described in the embodiments can also be applied when tanks are filled with hydrogen at the same time by three or more hydrogen feeders. In this case, the hydrogen fill factor of the tanks is obtained based on the hydrogen feed pressure of each of the three or more hydrogen feeders. When the highest hydrogen fill factor among a plurality of hydrogen fill factors found reaches the threshold fill factor, the hydrogen feeders are all stopped. Thus, the tanks can be filled with hydrogen to an appropriate hydrogen fill factor.

When filling the communicating tanks with hydrogen at the same time, each tank is preferably provided with a temperature sensor. The temperature sensors are preferably installed near the inlets of the tanks. Of the tanks, a tank group having a short hydrogen feed channel to the first hydrogen feeder makes up a first tank group, and a tank group having a short hydrogen feed channel to the second hydrogen feeder makes up a second tank group. As one example, there is a vehicle having filling ports on the right side and the left side of the vehicle, the tank group disposed to the left side of the vehicle makes up the first tank group, and the tank group disposed to the right side of the vehicle makes up the second tank. The first tank group and the second tank group communicate with each other, the first tank group is primarily fed hydrogen from the first hydrogen feeder connected to the filling port on the left side, and the second tank group is primarily fed hydrogen from the second hydrogen feeder connected to the filling port on the right side.

The station controller finds the first hydrogen fill factor from the highest temperature among the measured values of the temperature sensors of the first tank group and the hydrogen feed pressure of the first hydrogen feeder. The station controller finds the second hydrogen fill factor from the highest temperature among the measured values of the temperature sensors of the second tank group and the hydrogen feed pressure of the second hydrogen feeder. The station controller stops all hydrogen feeders when the higher hydrogen fill factor of the first hydrogen fill factor and the second hydrogen fill factor reaches a threshold fill factor.

The technology disclosed in the present specification may be an arrangement that feeds hydrogen to a tank other than a hydrogen tank installed in a fuel cell vehicle.

The hydrogen filling method is preferably based on regulations set forth by the Society of Automotive Engineers (SAE), but the technology disclosed in the present specification is not limited to SAE regulations.

Although specific examples of the present disclosure have been described in detail, these are only exemplifications, and do not limit the Claims. The technology set forth in the Claims includes various modifications and alterations of the specific example exemplified above. Technical elements described in the present specification or the drawings exhibit technical utility, either singularly or through various types of combinations, and do not limit combinations set forth in the Claims at the time of application.

What is claimed is:

1. A hydrogen filling system, comprising:
    a first tank and a second tank that are configured to be filled with hydrogen and communicate with each other;
    a first hydrogen feeder and a second hydrogen feeder configured to feed hydrogen to the first tank and the second tank; and
    a controller configured to control the first hydrogen feeder and the second hydrogen feeder,
    wherein the controller is configured to estimate a hydrogen fill factor of the first tank and the second tank, based on a first internal temperature of the first tank and a second internal temperature of the second tank, and a first pressure of hydrogen fed from the first hydrogen feeder and a second pressure of hydrogen fed from the second hydrogen feeder, and to stop the first hydrogen feeder and the second hydrogen feeder when the hydrogen fill factor reaches a predetermined threshold fill factor, wherein the controller is configured to calculate the hydrogen fill factor based on an average value of the first internal temperature and the second internal temperature, and a higher pressure of the first pressure and the second pressure, and wherein the hydrogen fill factor is an amount of the hydrogen to be filled.

2. The hydrogen filling system according to claim 1, wherein the controller is configured to calculate a first hydrogen fill factor that is a total hydrogen fill factor of the first tank and the second tank based on the first pressure and the first internal temperature, calculate a second hydrogen fill factor that is a total hydrogen fill factor of the first tank and the second tank based on the second pressure and the second internal temperature, and stop the first hydrogen feeder and the second hydrogen feeder when a higher fill factor of the first hydrogen fill factor and the second hydrogen fill factor reaches the threshold fill factor.

3. The hydrogen filling system according to claim 2, wherein:

a length of a hydrogen feed channel from the first hydrogen feeder to the first tank is shorter than a length of a hydrogen feed channel from the first hydrogen feeder to the second tank; and a length of a hydrogen feed channel from the second hydrogen feeder to the second tank is shorter than a length of a hydrogen feed channel from the second hydrogen feeder to the first tank.

4. The hydrogen filling system according to claim 1, wherein the first tank is configured of a plurality of sub-tanks, and the first internal temperature is the highest internal temperature of internal temperatures of the sub-tanks.

\* \* \* \* \*